United States Patent [19]

Makabe et al.

[11] 4,221,177

[45] Sep. 9, 1980

[54] SEWING MACHINE WITH STITCH-PATTERN CONTROL CIRCUITRY

[75] Inventors: Hachiro Makabe, Fussa; Kazuo Watanabe; Hideaki Takenoya, both of Hachioji; Toshihide Kakinuma, Tokyo; Toshiaki Kume, Tachikawa, all of Japan

[73] Assignee: Janome Sewing Machine Co. Ltd., Tokyo, Japan

[21] Appl. No.: 926,627

[22] Filed: Jul. 20, 1978

Related U.S. Application Data

[63] Continuation-in-part of Ser. No. 876,328, Feb. 8, 1978, abandoned, which is a continuation of Ser. No. 715,691, Aug. 19, 1976, Pat. No. 4,086,862.

[30] Foreign Application Priority Data

Oct. 17, 1975 [JP] Japan ................. 50-124306

[51] Int. Cl.$^2$ ............................................. D05B 3/02
[52] U.S. Cl. ................................................. 112/158 E
[58] Field of Search .......... 112/158 E, 121.11, 121.12; 364/900; 318/567, 569; 235/151.11

[56] References Cited

U.S. PATENT DOCUMENTS

3,977,338  8/1976  Wurst et al. ................. 112/121.11 X

FOREIGN PATENT DOCUMENTS

2702488  7/1977  Fed. Rep. of Germany ....... 112/158 E

Primary Examiner—Peter P. Nerbun
Attorney, Agent, or Firm—Michael J. Striker

[57] ABSTRACT

The stitch-control-signal outputs of a first memory are connected to the inputs of stitch-forming instrumentalities via an intermediate second memory. One of the two memories is a static memory which is read out by applying to the address signal inputs thereof a series of next-address signals derived from the signals produced at the output of that memory. Both memories may be static memories whose read-out is performed in that way. Alternatively, the intermediate memory may be a sequential-access dynamic memory, such as a shift register, whose read-out is effected by a train of indistinguishable shift signals. In the latter event, the read-out of the first memory is effected by applying to the address-signal inputs thereof a series of next-address signals derived from the output signals of the first memory and not performed in synchronism with machine operation, whereas the read-out of the dynamic sequential-access second memory is performed in synchronism with machine operation but without addressing codes and instead by trains of indistinguishable signals. The information read out from the intermediate second memory is written into it either from the first memory or alternatively from an external pattern data reader, such as a perforated-tape reader.

7 Claims, 9 Drawing Figures

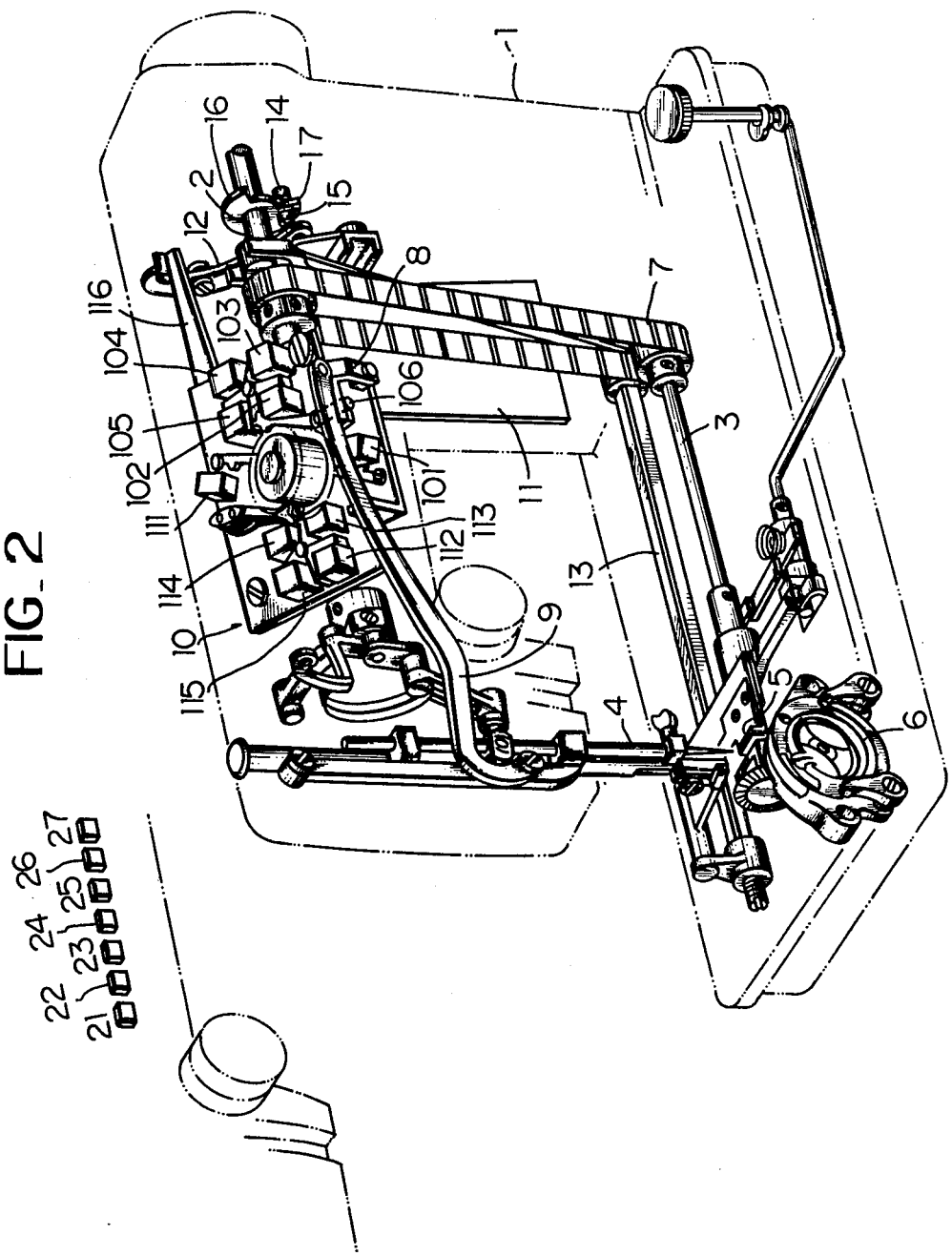
FIG_2

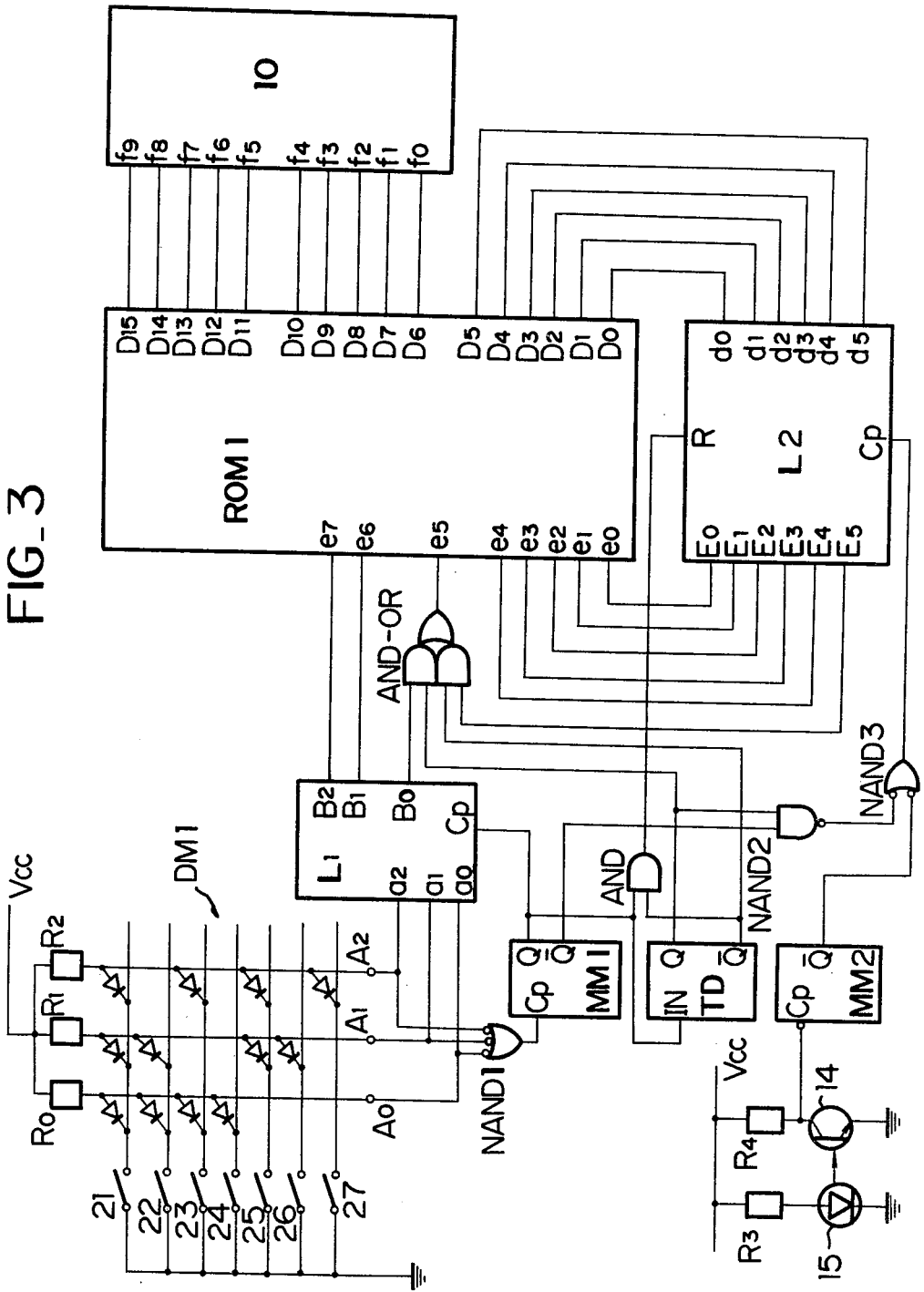
FIG_3

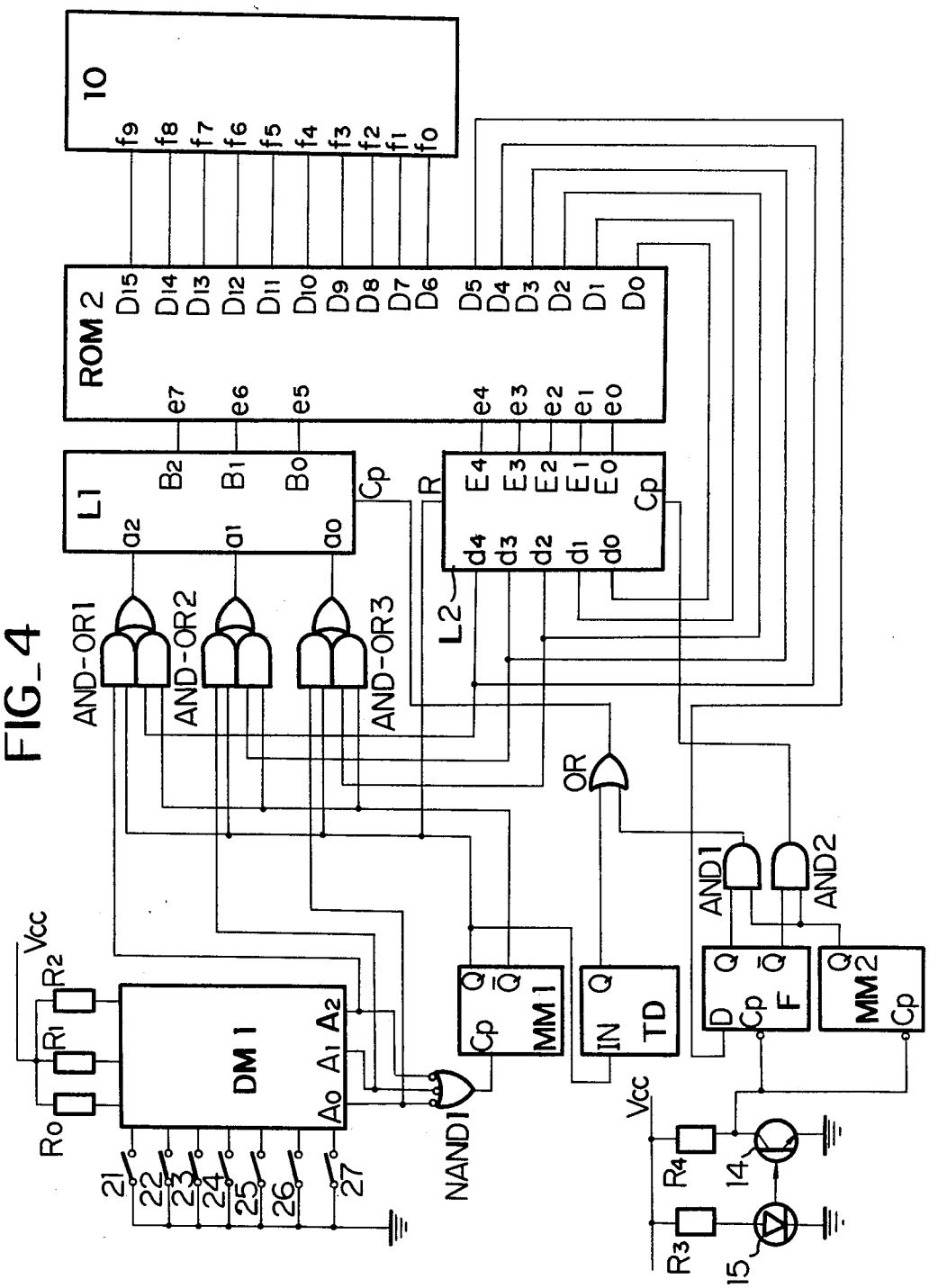
FIG_4

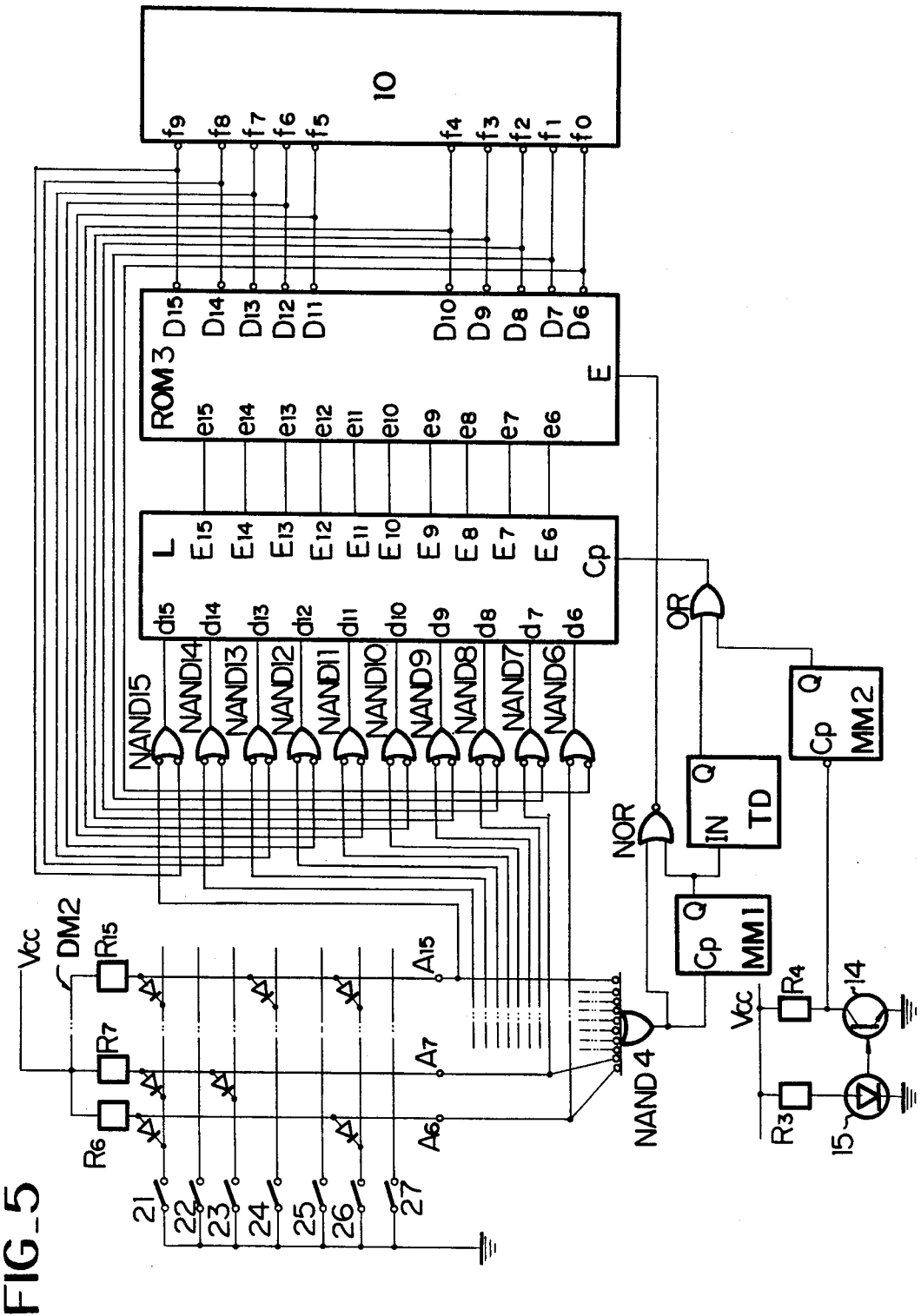
FIG_5

FIG_6
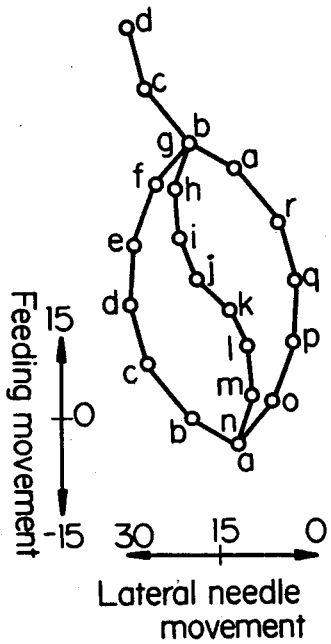
| Stitch | Lateral needle movement | | Feeding movement | |
|---|---|---|---|---|
| | Amount | Code | Amount | Code |
| a | 11 | 01011 | 5 | 01010 |
| b | 19 | 10011 | 10 | 00101 |
| c | 27 | 11011 | 11 | 00100 |
| d | 30 | 11110 | 11 | 00100 |
| e | 29 | 11101 | 11 | 00100 |
| f | 25 | 11001 | 8 | 00111 |
| g | 19 | 10011 | -9 | 11000 |
| h | 22 | 10110 | -9 | 11000 |
| i | 21 | 10101 | -7 | 10110 |
| j | 18 | 10010 | -6 | 10101 |
| k | 12 | 01100 | -7 | 10110 |
| l | 9 | 01001 | -9 | 11000 |
| m | 8 | 01000 | -9 | 11000 |
| n | 11 | 01011 | 8 | 00111 |
| o | 5 | 00101 | 11 | 00100 |
| p | 1 | 00001 | 11 | 00100 |
| q | 0 | 00000 | 11 | 00100 |
| r | 3 | 00011 | 10 | 00101 |

FIG_7a
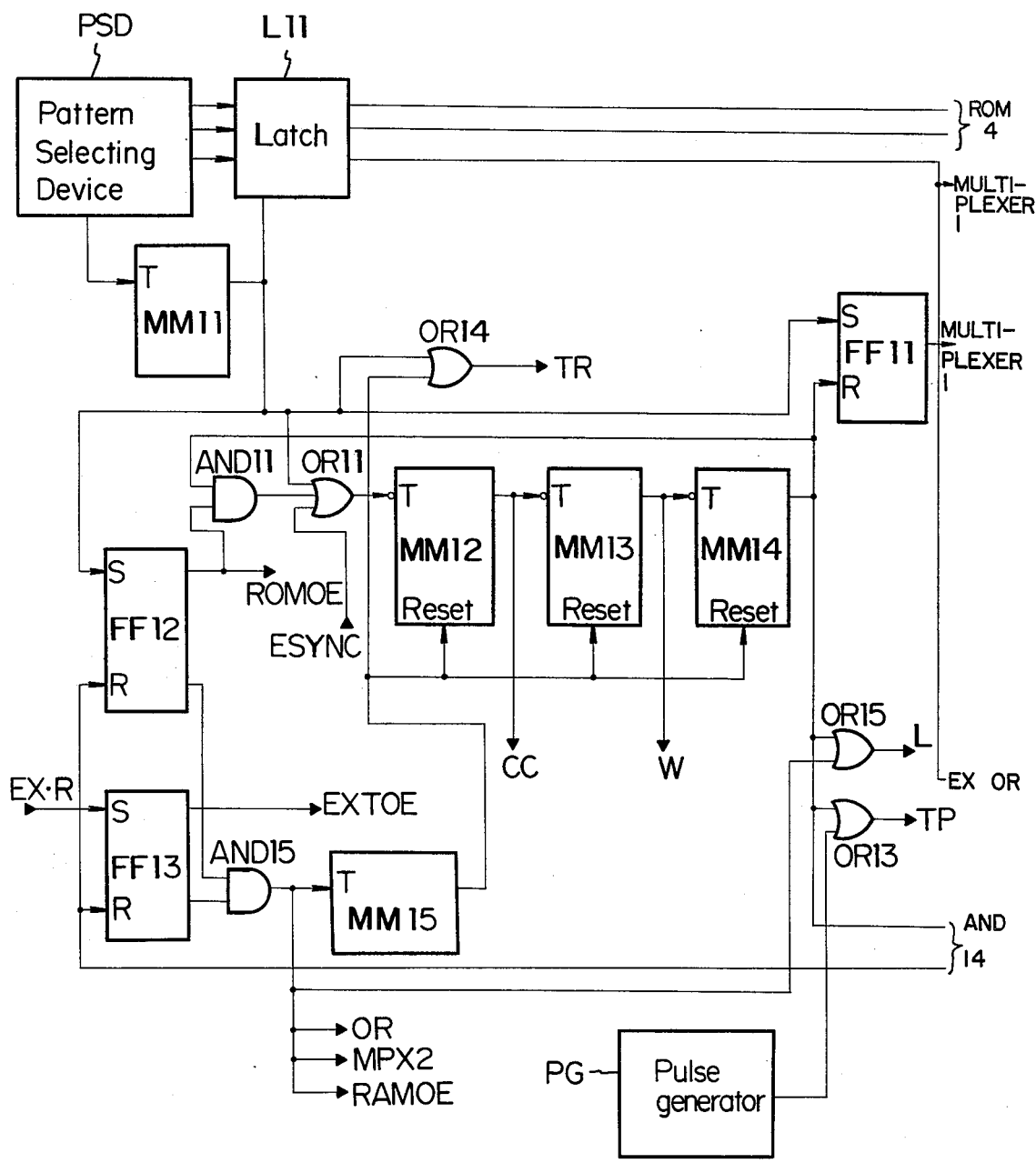

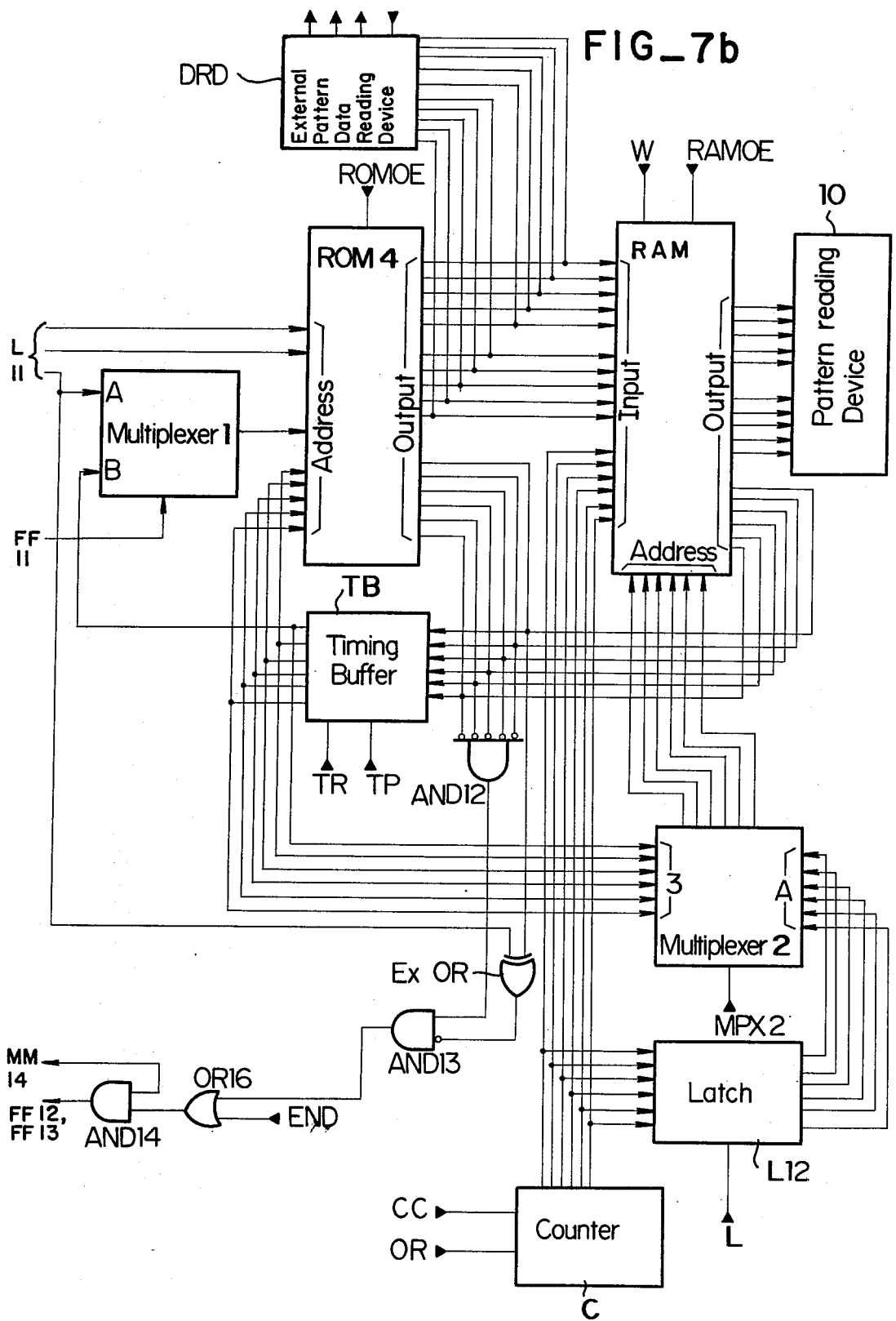
FIG_7b

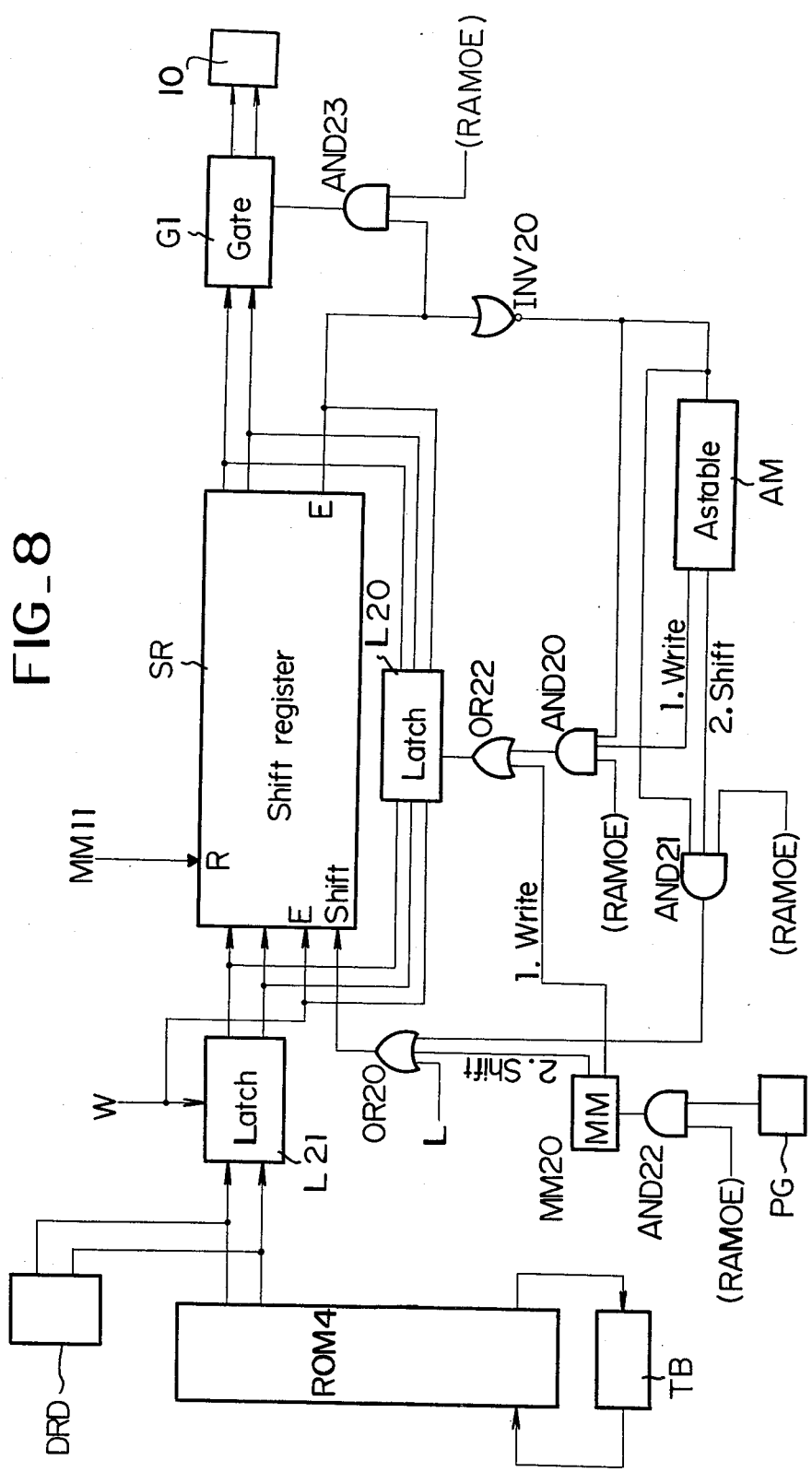
FIG_8

SEWING MACHINE WITH STITCH-PATTERN CONTROL CIRCUITRY

CROSS-REFERENCE TO RELATED APPLICATIONS

The present application is a continuation-in-part of copending application Ser. No. 876,328 filed Feb. 8, 1978, now abandoned, which in turn is a continuation of copending application Ser. No. 715,691 filed Aug. 19, 1976, now U.S. Pat. No. 4,086,862, granted May 2, 1978.

The entire disclosure of these copending applications is incorporated herein by reference.

BACKGROUND OF THE INVENTION

Parent application Ser. No. 715,691, now U.S. Pat. No. 4,086,862, discloses a sewing-machine stitch-pattern control circuit, in which any selected one of a plurality of patterns can be sewn. The stitch-control data for the plurality of patterns is stored in a read-only memory (ROM). The sewing-machine-synchronized read-out of the ROM is performed entirely without the use of addressing counters, and indeed with an addressing sequence which is derived from the signals produced at the outputs of the memory and which may have a very flexible character. In particular, each addressable storage unit within the ROM stores, not merely the stitch-control signals for one stitch of one of the patterns, but also information concerning the address of the storage location containing the stitch-control signals for the next stitch of that pattern.

When the operator selects one of the patterns, his selection determines the address of the first stitch-data-containing storage location to be read out in the ROM. The signals produced at the ROM outputs in response to read-out of the first-stitch data are used to address the next storage location to be read out from the ROM. Such next-address signals are produced at separate next-address signal outputs of the ROM, or else are derived from the stitch-control signals at the output of the ROM, or are derived from ROM output signals in more complicated ways disclosed in that patent. The read-out of the addressable ROM is accordingly not effected under the control of an addressing counter. Typical prior-art addressing counters establish a fixed sequence for the successive address signals to be read out from the ROM. In contrast, with the stitch-pattern control circuit disclosed in the above-identified patent, reference to an outside counter which dictates the read-out sequence is absent. Instead, the data content of each storage location read out itself determines what the next storage location to be read out should be.

On a practical level, the elimination of the use of prior-art addressing counters greatly increases the freedom with which data pertaining to individual stitches of plural selectable patterns can be assigned to storage locations within the ROM. To explain this, the following, somewhat oversimplified and exaggerated illustration is given. With a stitch-data ROM addressed by a prior-art addressing counter, the operator when he selects a pattern in effect selects the first one or two highest-place digits of a storage-location address, e.g., 100, 200, 300 or 400, etc. Then, when machine-synchronized read-out of the stitch data pertaining to the selected pattern begins, the addressing counter commences to add to the selected initial address (100 or 200 or 300 etc.) lower-value numbers, e.g., in the sequence 1, 2, 3, 4, etc. As a result, the first stored pattern, if selected by the operator, is read out using a storage-location address sequence 100, 101, 102, 103, 104, etc. If the operator selects the second stored pattern, it is read out using a storage-location address sequence 200, 201, 202, 203, 204, etc.

Thus, when the operator selects which stitch-pattern is to be read out, in effect he picks out the first 100 storage locations, or the second 100 storage locations, or the third 100 storage locations, etc., and then the addressing counter performs the read-out of the successive storage locations within the selected 100 storage locations. Clearly, when assigning storage locations to the stitch data of one pattern to be stored, these must all go into one of the selectable groups of 100 storage locations. On a first level, this can be wasteful of storage locations, in the sense that it may be desirable to store a mixture of few-stitch stitch patterns and many-stitch stitch patterns, requiring that each operator-selectable group of storage locations be large in number (to be able to accommodate the many-stitch stitch patterns) whereas the few-stitch stitch patterns very incompletely fill the storage-location groups they occupy. The inventive elimination of the prior-art use of addressing counters to read out the stitch-data ROM avoids this problem.

However, on a deeper level, the characteristic next-address-signal technique of the present invention, avoiding as it does the use of addressing counters, creates greater system flexibility in general, and not merely with respect to storage of few-stitch and many-stitch stitch patterns. For example, when the operator makes a pattern selection, this serves, in a way similar to prior art, to establish the one or few highest-value digits of the first address signal to be applied to the ROM to read it out. However, the lower-value digits of the first address signal need not come from the operator-activated pattern selector nor from an addressing counter. Thereafter, i.e., for subsequent stitches, all lower-value digits of each subsequent signal, and/or perhaps one or more of the highest-value digits of the address signals, are derived from the output signals of the ROM.

In principle, all digits of all succeeding address signals could be derived from the output signals of the ROM. In this way, the stitch-data memory becomes a very independent unit whose read-out sequence is controlled, so the speak, from the inside out, the content of each addressed storage location itself determining what storage location should next be read out, with little or no reference to outside control for determining the address of the next location to be read out. Accordingly, if a system is designed for a particular stitch-pattern ROM containing a predetermined plurality of specific stored stitch patterns, replacement of that ROM with another containing other stored stitch patterns organized in a quite different way will not necessarily call for modification of any neighboring components of the stitch-pattern control circuit. For example, if the largest number of stitches in any stored pattern is sixteen, a typical prior-art addressing counter must be able to count to sixteen, to be able to read-out such a pattern. If then, the ROM is replaced by another whose largest stored stitch pattern includes a greater number of stitches, this would require replacement of the addressing counter with another having the requisite increased counting capacity.

In contrast, with the next-address-signal technique of the present invention, such a modification of components cooperating with the replaced ROM would not be necessary, because the new ROM itself controls its own read-out, so to speak from the inside out. This is an example of the type of greater system flexibility in question, and is disclosed in the patent identified above.

The present invention relates to further developments upon systems of that type. Firstly, the invention contemplates stitch-pattern control either under the control of such ROM or, alternatively, under the control of pattern data furnished from an external pattern reading device, e.g., a perforated-tape reading device. To this end, the present invention provides an intermediate second memory, connected between the outputs of the first memory and the inputs to the stitch-forming instrumentalities. When it is desired that one of the stitch patterns stored in the first memory be sewn, the selected pattern is read out from the first memory at high speed, not synchronized to sewing-machine operation, and written into the intermediate second memory. Thereafter, the pattern information thusly transferred to the second memory is read out in synchronism with sewing-machine operation and applied to the stitch-forming instrumentalities. This creates the possibility to write into the second memory information derived, not from the first memory, but derived instead from the external pattern reader, e.g., a perforated-tape reader or the like.

When two memories are thusly employed, one or both can be addressed for read-out in accordance with the inventive next-address-signal technique without reliance on read-out addressing counters. Alternatively, only the first memory might be so addressed, and the second memory be addressed for write-in and/or read-out in a different way.

In one embodiment of the invention, the second memory is a RAM having stitch-control signal inputs and outputs, and also having next-address-signal inputs and outputs in addition to its address-signal inputs. The read-out of the first memory is effected using the next-address-signal technique in question. The stitch-control information written into the second memory is written in along with a series of next-address signals. This occurs at high speed, not in synchronism with sewing-machine operation. Thereafter, the machine-synchronized read-out of the second memory is likewise effected using the next-address-signal technique in question, the signals produced at the next-address signal outputs of the second memory being fed back to the address signal inputs thereof.

In another embodiment, the first memory is a static random-access read-only memory, but the second memory is a sequential-access dynamic memory, e.g., a circulating or reentrant shift register memory. Again, the read-out of the first memory and the transfer of its information to the second memory is effected at high speed, not in synchronism with machine operation. Thereafter, the read-out of the sequential-access dynamic memory is performed in synchronism with sewing-machine operation, but does not involve the use of an addressing code, or the like, the read-out instead being performed by a train of machine-synchronized read-out pulses indistinguishable from one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 depicts portions of the mechanical components of one novel sewing machine, in an overall view;

FIG. 3 depicts one exemplary circuit for the pattern selecting and control arrangement;

FIG. 4 depicts a second exemplary circuit for the pattern selecting and control arrangement;

FIG. 5 depicts a third exemplary circuit for the pattern selecting and control arrangement;

FIG. 6 depicts in tabulated form the correlation between the stitches in one exemplary stitch pattern and the code utilized to represent the individual stitches of the pattern;

FIGS. 7a and 7b are the left and right halves of a diagram depicting a fourth exemplary circuit for the pattern selecting and control arrangement, most similar to that of FIG. 3, but in which an intermediate random-access memory is connected between the output of the read-only memory and the input to the pattern-forming means; and FIG. 8 depicts the modified part of a modified version of the embodiment shown in FIGS. 7a and 7b, with the read-only memory being connected to the pattern-forming means through the intermediate of a sequential-access dynamic memory.

DESCRIPTION OF THE PREFERRED EMBODIMENTS

Figure 1:
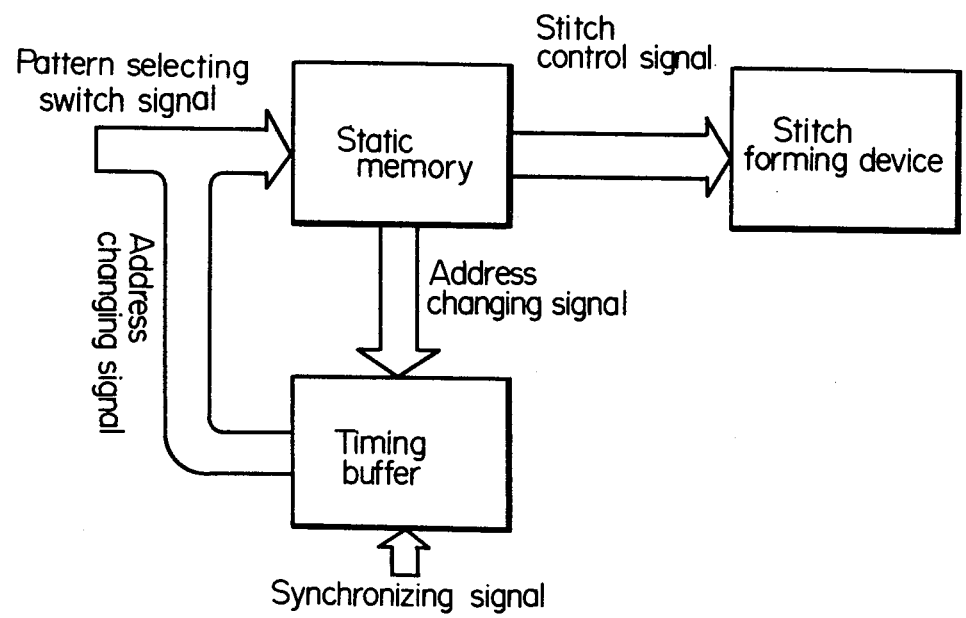
FIG. 1 is a schematic information flow diagram graphically depicting certain important aspects of the information flow in exemplary ones of the electronic sewing machines of the present invention.

FIGS. 1–6 are identical to FIGS. 1–6 of U.S. patent application Ser. No. 715,691, filed Aug. 19, 1976, now U.S. Pat. No. 4,086,862, granted May 2, 1978, the entire disclosure of which is incorporated herein by reference. Attention is directed to that patent for a detailed description of FIGS. 1–6.

FIGS. 7a and 7b are respectively the left and right halves of a circuit diagram of a fourth embodiment of the invention, most similar to the embodiment of FIG. 3, but illustrating subject matter which can be utilized in connection with the embodiments of any of FIGS. 3–5.

In FIG. 7b, a read-only memory ROM 4, like ROM 1 in FIG. 3, is again used, having five upper outputs and five middle outputs for stitch control signals, and six lower outputs for next-address signals. As in FIG. 3, the next-address signals at the six lower outputs are fed back to the bottom six address-signal inputs of ROM 4, but again through the intermediary of a timing buffer TB corresponding to latch L2 of FIG. 3. The uppermost three address-signal inputs of ROM 4, as in FIG. 3, receive signals from a pattern-selection unit PSD, like the selector-switch 21–27 and diode-matrix DM1 combination of FIG. 3.

However, in FIG. 3, the ten stitch-control-signal outputs of the read-only memory are directly connected to the pattern-forming instrumentalities 10. In FIGS. 7a–7b, they are instead connected to the inputs of a random-access memory RAM serving as an intermediate information storage. In FIGS. 7a–7b, the read-out of the read-only memory ROM 4 is performed essentially as described with respect to FIG. 3, but only once per pattern selection, and the information read out from ROM 4 is transferred to the random-access memory RAM, i.e., to the intermediate storage, from which such information is repeatedly read out in synchronism with sewing-machine operation. Thus, the storage which is read out in synchronism with machine operation is the intermediate storage RAM. Instead of writing into the RAM selected information from ROM 4, in an alternative mode of operation information can be written into RAM from an external program, utilizing an external pattern data reading device DRD.

The embodiment of FIGS. 7a-7b has three main modes of operation. In the first mode of operation, a pattern is selected using pattern-selecting device PSD, and information concerning the selected pattern is read out from ROM 4 and then written into random-access memory RAM. In the second mode of operation, information from ROM 4 is not utilized; instead the information to be written into memory RAM is received from the data reading device DRD. In the third mode of operation, the information written in memory RAM is read out in synchronism with machine operation to control stitch-pattern formation.

First mode of operation:

The operator selects one of seven patterns using pattern-selecting device PSD. A corresponding 3-bit coded pattern-identifying signal is applied to the input of latch L 11. Whenever the operator selects a pattern, pattern-selecting device PSD also triggers a monostable multivibrator MM 11, and the output signal of MM 11 activates latch L 11, so that the 3-bit pattern-identifying signal is thereafter persistently registered at the outputs of Latch L 11. This output signal of MM 11 furthermore sets the two flip-flops FF 11 and FF 12, and is also applied to the upper inputs of OR-gates OR 11 and OR 14. The "1" signal now present at the output of flip-flop FF 11 is applied to the mode-control input of MULTIPLEXER 1, connecting the output of the latter to the A input thereof.

The "1" signal at the upper output of flip-flop FF 12 is transmitted to the ROMOE (ROM output enable) input of ROM 4, enabling the outputs of memory ROM 4; the "1" signal from FF 12 is additionally applied to the lower input of AND-gate AND 11. The "1" signal at the output of OR 11 triggers a monostable multivibrator MM 12; the signal then appearing at the output of MM 12 next triggers a monostable multivibrator MM 13; and the output signal of the latter then triggers a monostable multivibrator MM 14. In turn, the output signal of MM 14 is transmitted, via AND 11 and OR 11, back to the input of MM 12, and the latter is triggered a second time, in turn triggering MM 13 and MM 14.

Thus "1" signals are repeatedly produced at the outputs of each one of MM 12, MM 13 and MM 14, in the manner of an astable multivibrator oscillator. This oscillation is later stopped, in a manner described below, when flip-flop FF 12 removes the enabling "1" signal from the lower input of AND-gate AND 11.

As indicated at CC in FIGS. 7a and 7b, the output of MM 12 is connected to the counting input of a counter C, so that the "1" signals repeatedly appearing at the output of MM 12 can be counted. As indicated at W, the output of MM 13 is connected to the write-pulse input of random-access memory RAM; whenever MM 13 transmits a "1" signal thereto, the signals at the sixteen left inputs of RAM are written into whichever of the storage units of RAM is presently being addressed by the signals at the six bottom inputs of RAM.

The output of MM 14 is, as already stated, connected to the upper input of AND 11, but additionally to the reset input R of flip-flop FF 11; furthermore, via an OR-gate OR 13, to the activating input TP of timing buffer TB; furthermore, via an OR-gate OR 15, to the latching input L of a latch 12; and finally, via an AND-gate AND 14, to the reset inputs R of flip-flops FF 12 and FF 13.

The six address signal inputs at the bottom of RAM are connected to the outputs of MULTIPLEXER 2. The mode-control input MPX2 of this multiplexer is connected to the output of AND-gate AND 15. Depending upon whether mode-control input MPX2 receives a "0" signal or a "1" signal, the six outputs of the multiplexer are connected either to the six A inputs or the six B inputs thereof.

Thus, when the operator uses pattern-selecting device PSD to select one of seven patterns, read-only memory ROM 4 is read out, substantially as described with respect to FIG. 3, but virtually instantaneously under the control of the free-running pulse-generating circuit MM 12, MM 13, MM 14, i.e., not in synchronism with sewing-machine operation. At the same time, this free-running pulse-generating circuit controls the orderly transfer of the pattern information read out from ROM 4 to the memory RAM.

This transfer of information from ROM 4 to memory RAM occurs as follows. First to be noted is the fact that the pulses applied to inputs CC, W and L of counter C, memory RAM and latch L, respectively, are generated in the order CC, then W, then L. The stitch-control signals pertaining to the first stitch appear at the ten upper outputs of ROM 4 and are applied to the ten upper left inputs of memory RAM, but are not yet written in. The six-address signal inputs at the bottom of memory RAM are in receipt of an address signal, from counter C via latch L 12 and MULTIPLEXER 2, addressing for example RAM storage unit #1 (having an address 000000). Then a CC pulse is generated, and the address count on counter C advances by one, e.g., to value #2 (000001). This count is applied to the bottom six left inputs of memory RAM, these constituting inputs for receipt of next-address signals which are to be memorized; these bottom six left inputs are not address inputs per se. Although the counter C is now at address #2 (000001), the six address inputs at the bottom of memory RAM are still in receipt of address #1 (000000). At this point, the write pulse W is generated. In response, memory RAM registers, in storage unit #1 (000000) thereof, the ten stitch-control signals pertaining to the first stitch and received from the ten upper outputs of ROM 4, and also registers in this storage unit #1 (000000) the address (000001) for storage unit #2, which is being applied to the six lower left inputs (next-address-signal inputs) of memory RAM from the output of counter C. The write pulse W then ceases, and memory RAM is no longer responsive to input information. Then, the latch pulse L for latch L 12 is generated. As a result, the latch L 12 now, and only now, registers the address (000001) for storage unit #2, and this address is applied via MULTIPLEXER 2 to the address inputs of memory RAM. Then the next CC, W and L pulses are generated, in the stated order, and the foregoing is repeated, but for the stitch-control signals from ROM 4 pertaining to the second stitch and for the second storage unit in memory RAM.

When this process has been repeatedly performed, and the transfer of stitch control information from ROM 4 to memory RAM almost completed, the successive storage units of memory RAM will contain the following: Storage unit #1 (address 000000) of RAM stores the ten stitch-control signals for the first stitch of the selected pattern, and additionally stores the address (000001) for (next) storage unit #2; storage unit #2 (000001) of RAM stores the ten stitch-control signals for the second stitch of the selected pattern, and additionally stores the address (000001) for (next) storage unit #3; etc.

When the stitch-control signals for the last stitch of the selected pattern appear at the ten upper outputs of ROM 4, the following occurs. The signals at the bottom five next-address-signal outputs of ROM 4 are all "0", and the signal from the uppermost one of the six next-address-signal outputs of ROM 4 is the same with the signal at the lowest out-put of L 11. This situation, existing only when the information concerning the last stitch in a pattern has been reached, is detected by AND-gates AND 2, AND 3 and by EXCLUSIVE-OR-gate EXOR.

A "1" signal appears at the output of AND 4, and this resets the flip-flops FF 12 and FF 13. As a result, a "1" signal appears at the output of AND-gate AND 15, and this signal is transmitted to counter-reset input CR resetting counter C to 000000 (address #1). The feedback AND-gate AND 11 is disabled, so that pulse generator M 12, MM 13, M 14 cannot continue except for one more cycle of operation, and the circuitry is readied for read-out of memory RAM, which then actually occurs in the third mode of operation, discussed below. It is to be noted that, in memory RAM, the storage unit which stores the ten stitch-control signals pertaining to the last stitch of the selected pattern additionally stores the next-address signal 000000 so that, later when memory RAM is read out, the read-out of the last-stitch stitch-control signals is followed by a read-out of the first-stitch stitch-control signals, i.e., for pattern repetition.

Second mode of operation:

This operating mode is very similar to the one just described, but the pattern-control information is transferred into memory RAM, not from ROM 4, but instead from the external data reading device DRD. Unit DRD may be of any conventional type, e.g., a magnetic-type reader, a perforated-tape reader, or the like. Unit DRD has a control input EXTOE (external read-out device output enable) which receives a signal to enable information to be transmitted to the outputs of unit DRD. Unit DRD furthermore has three outputs; EXT R (external data reading command); E SYNC (external data read out synchronizing signal); and END (end of external data read-out).

The data read-out by data reader DRD consist of a sequence of 11-bit words e.g., derived from an eleven-track perforated tape, or the like. 10 bits in each 11-bit word constitute stitch-control information, and these are transmitted to the ten stitch-control-signal inputs of memory RAM. The 11th bit is reserved for eventually indicating that reading of the whole sequence of 11-bit words has been completed, whereupon a signal is produced at output END. When the reading of the external data is about to start, unit DRD generates a signal on its output EXTR (external data read command). This signal is applied to the set input of flip-flop FF 13, setting the latter, as a result of which the upper output of FF 13 applies a signal to input EXTOE of reading device DRD. Also, because FF 13 is now set whereas FF 12 is still reset, the output signal of AND 15 enables counter C for counting, connects the outputs of MULTIPLEXER 2 to the A inputs thereof, and disables input RAMOE of memory RAM so that signals will not appear at the output of RAM. Because flip-flop FF 12 is in reset state (not having been set by pattern-selecting device PSD), AND 11 is disabled, disconnecting the feedback branch of the multivibrator chain MM 12, MM 13, MM 14. Accordingly, the operation of the multivibrator chain is now monostable, instead of astable. When the first 11-bit word appears at the output of reading unit DRD, a signal also appears at output ESYNC of unit DRD. This signal is applied to the bottom input of OR 11, as a result of which the multivibrator chain successively generates the CC, W and finally the TP and L pulses as in the first operating mode. The flow of the 10-bit word from reading device DRD to memory RAM is otherwise the same as in the first operating mode, already described. When the second 11-bit word appears at the output of DRD, an ESYNC pulse is again applied to OR 11, and the second 10 bits of stitch-control information are written into the next storage unit of memory RAM, i.e., exactly as in the first operating mode. Etc.

When the last 11-bit word appears at the outputs of DRD, the 11th bit thereof now indicates that this is the last word in the sequence to be read; i.e., a signal is produced at output END and applied to the lower input of OR 16. Accordingly, a "1" signal appears at the output of AND 14, resetting FF 13, and performing the other functions readying memory RAM for machine-synchronized read-out, as already described with respect to the first mode of operation.

Third mode of operation:

The first and second modes of operation (write-in into memory RAM) both end with the appearance of a signal at the output of AND 14, thereby resetting both FF 13 and FF 12 (if not already in reset state), and automatically readying the circuit for the third mode of operation (machine-synchronized read-out of memory RAM), which then commences as soon as the sewing machine begins to operate, e.g., when its footpedal is depressed. When this commences, the only pulses transmitted by the part of the circuit depicted in FIG. 7a are those from pulse generator PG, which generates pulses synchronized with the rotation of the upper shaft of the sewing machine, these pulses being transmitted to the output of OR 13, and from there to activating input TP of timing buffer TB.

The read-out of memory RAM is performed in a manner similar to the read-out of ROM 4, already explained. The six bottom right outputs of memory RAM are next-address-signal outputs, connected to the inputs of timing buffer TB. The outputs of timing buffer TB are connected, via MULTIPLEXER 2, to the address-signal inputs of RAM. Thus, each time that timing buffer TB is activated by a machine-synchronized pulse from pulse generator PG, the next-address signals at the output of memory RAM are fed back to the address-signal inputs of RAM, and the next ten stitch-control signals appear at the ten stitch-control-signal outputs of RAM, in the manner of ROM 4. In this way, the successive stitches of the selected stitch pattern are sewn. When the ten stitch-control signals for the last stitch in the pattern appear at the upper ten outputs of RAM, there appear at the six next-address-signal outputs of RAM the address for the RAM storage unit containing the stitch-control signals for the first stitch of the pattern, and accordingly the selected stitch pattern is repeatedly produced.

FIG. 8 depicts the modified part of a modified version of the embodiment depicted in FIGS. 7a–7b. In FIGS. 7a–7b, the read-only memory ROM 4 is not directly connected to the pattern-forming instrumentalities 10 as in FIGS. 3–5, but instead is connected thereto via a static random-access memory RAM, which latter serves as an intermediate storage. In FIGS. 7a–7b, the read-out of both ROM 4 and RAM are performed without the use of address counters, the read-out of the former in a free-running mode not in synchronism with sewing-machine operation, the read-out of the latter is a sewing-machine-synchronized manner. In FIGS. 7a–7b, the memory RAM, i.e., the memory read out in synchronism with sewing machine operation, as already stated does not require for its read-out the use of an addressing counter, the next-address signals for the read-out of memory RAM being derived from the output of the memory itself. In the embodiment of FIG. 8, the intermediate memory is not a static memory, neither a read-only static memory (ROM 4) nor a write-read static memory (RAM). Instead, the intermediate memory is a sequential-access memory in the form of a reentrant shift register storage. A reentrant shift register storage differs from the RAM of FIGS. 7a–7b in the following respects: It is a dynamic memory, not a static memory; the information stored in it (concerning the various stitches of a stitch pattern) do not have constant locations, but instead change location continually, i.e., the storage is dynamic. Furthermore, the sewing-machine-synchronized read-out of the dynamic memory does not involve an addressing code. Instead, the sewing-machine-synchronized read-out of the dynamic memory is effected by trains of machine-synchronized pulses each pulse of which is identical to the pulse before it.

FIG. 8 depicts only the modified part of the modified version of FIGS. 7a–7b. The memory RAM, counter C, latch L 12 and MULTIPLEXER 2 of FIG. 7b are entirely eliminated. The components of FIG. 7a are unchanged, except that the machine-synchronized pulse generator PG is not connected to the input of OR 13, but instead connected as shown in FIG. 8 (and described below). The CC pulses generated by the components in FIG. 7a are not needed, because of the absence of a counter C. The RAMOE (RAM output enable) signal generated at the output of AND 15 in FIG. 7a continues to be used, but not as an output-enable signal for a dynamic, sequentially accessed memory.

In FIG. 8, the ROM 4 is exactly the same as before. For simplicity, its two groups of five stitch-control signal outputs are shown in FIG. 8 as two single lines. Its read-out circuitry is repeated, to the extent of a simplified showing of timing buffer TB. The read-out of ROM 4 is performed identically to FIGS. 7a–7b, and therefore need not be described again. The ten outputs of data reading device DRD, shown in FIG. 8 as two lines, are again connected to corresponding ones of the ten stitch-control outputs of ROM 4. These ten stitch-control signal lines are connected, via a latch circuit L 21, to the upper ten data inputs of a dynamic memory, here a shift register SR. The corresponding ten data outputs of shift register SR are connected, via a gating circuit G 1, to the pattern-forming instrumentalities 10.

In addition to the ten data inputs just mentioned, shift register SR has an eleventh data input E, which is reserved for data serving only to indicate whether the end of the pattern has been reached or not; this is described further below. Shift register SR has a corresponding output E. Finally, shift register SR has a shift-pulse input. For simplicity, the shift register SR can be considered to consist of eleven parallel-connected shift registers, for the shifted registering of 11-bit words. Additionally, shift register SR has a reset line R, connected to the output of monostable multivibrator MM 11 of FIG. 7a, for resetting the shift-register storage units to "0" in response to selection of a new pattern by pattern-selecting device PSD.

The ten stitch-control-signal outputs of shift register SR (shown as two lines) and the eleventh data output E thereof, are fed back to the corresponding inputs of the shift register, via a reentry latch circuit L 20.

Three different sources furnish shift pulses to the shift-pulse input of shaft register SR, via an OR-gate OR 20. One input of OR 20 is connected to receive the L pulses from the output of OR 15 in FIG. 7a. The middle input of OR 20 is connected to receive shift pulses from the sewing-machine-synchronized pulse generator PG, via an AND-gate 22 and a monostable circuit MM 20. The right input of OR 20 is connected to receive shift pulses from a data-reentry control circuit which comprises an inverter INV 20, an astable multivibrator circuit AM, two AND-gates AND 20, AND 21, and an OR-gate OR 22.

The circuit of FIG. 8 operates as follows:

The operator selects one of seven patterns stored in ROM 4, by activating pattern-selecting device PSD. As before, this produces a pulse at the output of MM 11. This pulse is applied to reset input R of shift register SR. As a result, all storage locations in SR are reset to "0" state; as will become apparent, it is the resetting to "0" state of the 11th-data-track or E stages which is of importance.

Read-out of ROM 4 commences and proceeds in exactly the way already described. During read-out of ROM 4, as before, the output signal of AND 15 in FIG. 7a is a "0"; i.e., there is at the output of AND 15 no RAMOE (RAM output enable signal). In this embodiment, the RAMOE signal is used as a sequential-access-memory output-enable signal; to correlate with the description of FIGS. 7a–7b this signal appears in FIG. 8 in parentheses as (RAMOE), to remind the reader that this is the same signal, but that it now is used for the control of a sequential-access memory, not a random-access memory. Accordingly, with no output signal RAMOE in existence, AND-gates AND 20, AND 21, AND 22, AND 23 in FIG. 8 are all disabled and thus can, for the moment, be simply ignored.

When the ten-stitch-control signals (two groups of five each) pertaining to the first stitch in the selected pattern appear at the outputs of ROM 4, these are applied to the ten inputs of latch circuit L 21, but not yet transmitted to the ten stitch-control-signal inputs of shift register SR.

When the first write pulse W appears (at the output of MM 13 in FIG. 7a), this pulse is applied to the control input of L 21, and the ten stitch-control signals are applied to the ten stitch-data inputs of SR, and are registered by the first (leftmost) shift-register stage. Additionally, the write pulse W is applied to the 11th data input E of shift register SR and registered. Thus, the first (leftmost) 11-bit shift-register stage now stores the following: the ten stitch-control signals pertaining to the first stitch in the selected pattern and in addition thereto, in data-track E, a "1" signal from the write pulse W itself. This "1" signal indicates that the associated 10-bit word pertains to a stitch in the selected pattern.

After this first write pulse W, MM 14 (FIG. 7a) generates, via OR 15, the first L pulse, used in FIG. 8 as a shift pulse. This first L pulse is transmitted, via OR 20, to the shift-pulse input of shift register SR. As a result, the 11-bit word in the first (leftmost) register stage shifts to the second (next to leftmost) register stage.

Next, there appear at the ten stitch-control-signal outputs of ROM 4 the stitch-control signals pertaining to the second stitch of the selected pattern. These are applied to latch circuit L 21, but are not yet transmitted to the upper ten data inputs of register SR. Then, the second write pulse W is generated, these second-stitch stitch-control signals are entered into the leftmost register stage and, as just explained, the write pulse W itself is also entered into this register stage in the E data-track thereof. Then, the second pulse L is generated and applied to the shift-pulse input. As a result, the first-stitch stitch-control signals (accompanied by a "1" in the E data track) shift from the second to the third register stage; the second-stitch stitch-control signals (likewise accompanied by a "1" in the E data track) shift from the first (leftmost) to the second stage of shift register SR.

This process continues, for each successive stitch in the pattern.

When the stitch-control signals for the last stitch in the selected pattern appear at the outputs of ROM 4, the last write pulse W causes these to be registered in the first (leftmost) register stage (along with a "1" signal in the E data track), and then the last shift pulse L shifts the last-stitch data from the first (leftmost) to the second register stage. The transfer of the stitch-control signals for the selected pattern from ROM 4 to shift register SR has been completed.

As before, upon completion of the transfer of information from ROM 4 to the intermediate memory (here sequential-access memory SR), a "1" signal appears at the output of AND 15, indicated in FIG. 8 as (RAMOE), to show the correlation to the preceding embodiment, but with parentheses used to remind the reader that the intermediate-memory output enable signal no longer pertains to an RAM.

Signal (RAMOE) is applied to the inputs of AND-gates AND 20, AND 21, AND 22 and AND 23 in FIG. 8. No "1" signal appears yet at the output of AND 22, because the sewing machine is not yet in operation; e.g., its footpedal has not yet been depressed. No "1" signal yet appears at the output of AND 23. The left input of AND 23 is connected to the E-data-track output of shift register SR. As will be recalled, prior to the write-in into shift register SR, all its data locations, and in particular its E-track locations, were reset to state "0". Upon completion of the write-in into shift register SR, the first-stitch control signals had achieved a rightwards-shifted location, but not so far as to reach the last shift-register stage and appear at the shift register outputs, the number of shift-register stages being greater than the highest number of stitches in a selectable pattern. Accordingly, because the first-stitch word has not yet reached the outputs of SR, the "1" bit in the E-track of the first-stitch word has not yet reached the E-data-track output, and therefore a "0" signal is being applied to the left input of AND 23; gating circuit G 1 is not enabled, and shift-register output signals are not yet transmitted to pattern-forming means 10.

Because a "0" signal is present at the E-track output of SR, a "1" signal is present at the output of inverter INV 20. This "1" signal informs the system that the 11-bit word at the output of the shift register (the 11th bit of which is the E bit) is not one of the 11-bit words associated with the stitches of the selected pattern. This "1" signal is applied to the right input of AND 20, enabling AND 20 for transmission of any signals received at its middle input. Also, this "1" signal is applied to the top input of AND 21, enabling AND 20 for transmission of any signals received at its middle input. Furthermore, this "1" signal is applied to the input of an astable-multivibrator circuit AM. When multivibrator circuit AM is in receipt of an input "1" signal, it produces on its lower output a train of shift pulses and on its upper output a train of write pulses, the first write pulse leading the first shift pulse.

The first write pulse produced at the output of AM is applied, via AND 20 and OR 22, to the latching input of latch L 20. In response, the eleven signals at the output of shift register SR are latched to the eleven outputs of Latch L 20, and thereby written into the first (leftmost) stage of register SR. Then, the first shift pulse produced at the output of AM is applied, via AND 21 and OR 20, to the shift-pulse input of register SR, causing all information therein to shift one stage rightward. It will be assumed that, after this shift, the first-stitch control information has not yet reached the last (rightmost) shift-register stage, so that a "0" signal continues to appear at the E-data-track output of register SR.

Because, in accordance with the assumption just stated, the signal at the E-data-track output of SR is still a "0", the process just described repeats itself. I.e., the astable multivibrator circuit AM produces a second write pulse, and slightly thereafter a second shift pulse. As this process continues, the stitch-control information in register SR is repeatedly shifted rightwards, the first-stitch information being shifted nearer and nearer to the last (rightmost) stage of register SR. During this process, the reentry of information from the shift-register output back to the shift register input via latch L 20 is not of importance with respect to the ten stitch-control data tracks, but is of importance with respect to the E-data-track signals.

Ultimately, the 11-bit word associated with the first stitch of the selected pattern appears at the eleven outputs of register SR, with a "1" signal appearing at the E-data-track output indicating that, at last, stitch-control signals pertaining to the selected pattern have reached the shift-register output. Accordingly, a "0" signal appears at the output of inverter INV 20. This "0" signal is applied to the input of astable-multivibrator circuit AM, causing the latter to case generation of shift and write pulse trains. To assure at this point that no further shift or write pulses reach register SR or latch L 20, the "0" signal at the output of inverter INV 20 is furthermore applied to the right input of AND 20 and to the top input of AND 21, instantly blocking the transmission of further pulses (if any) appearing at the shift and write pulse outputs of astable-multivibrator circuit AM.

Furthermore, now that a "1" signal has at last appeared at the E-track output, AND 23 produces an output "1" signal, and enables gating circuit G 1 for transmitting stitch-control signals from the shift-register output to the pattern-forming means 10.

The foregoing process, by means of which the pattern information written into shift register SR is shifted until the first-stitch information appears at the shift-register outputs, is of course performed at electronic speed, and consumes virtually zero time compared to the operation of the mechanical and electromechanical components of the sewing machine.

The system is now in readiness to start sewing the selected stitch pattern.

The operator depresses the footpedal controller, or the like, and the upper shaft of the machine starts turning. Machine-synchronized pulse generator PG begins to generate machine-synchronized output pulses. The stitch-control signals for the first stitch of the pattern were already applied to the pattern-forming means 10. The first machine-synchronized pulse produced by PG is applied, via AND 22, to the input of a monostable-multivibrator circuit MM 20. In response to receipt of a machine-synchronized pulse, MM 20 produces a first write pulse at its write-pulse output, followed quickly by a first shift pulse at its shift-pulse output. This first write pulse is applied, via OR 22, to the lacthing input of L 20. As a result, the first-stitch word (all 11 bits) present at the output of register SR are latched to the outputs of L 20, and thereby reentered into the first (leftmost) stage of SR. The quickly following first shift pulse is applied, via OR 20, to the shift pulse of register SR. In response, the second-stitch control signals (and accompanying "1" in the E track) appear at the outputs of register SR, and the reentered first-stitch control signals are shifted from the first (leftmost) shift-register stage to the second stage of the register. The second-stitch control signals are applied to the pattern-forming means 10.

In the same way, the second write pulse produced by monostable-multivibrator circuit MM 20 causes the second-stitch control signals at the output of SR to be reentered, via latch L 20, into the first (leftmost) stage of register SR, and then the second shift pulse causes the third-stitch control signals to appear at the output of register SR and causes the second-stitch control signals to shift from the first (leftmost) to the second stage of register SR.

This process continues, and the selected stitch pattern is sewn.

Eventually, the stitch-control signals for the last stitch of the selected pattern appear at the outputs of register SR, and are transmitted to the pattern-forming means 10. Then, machine-synchronized pulse generator PG produces one more synchronizing pulse. In response, MM 20 generates a write pulse, which is applied via OR 22 to latch L 20, causing the last-stitch control signals to be reentered into the first (leftmost) shift-register stage; then MM 20 generates a shift pulse, which is applied via OR 20 to the shift-pulse input of SR, shifting all information in the register one stage rightward. As a result, a "0" signal appears at the E-data-track output of register SR, and therefore a "1" signal appears at the output of inverter INV 20. This indicates that, once more, the signals present in the terminal (rightmost) register stage have nothing to do with the selected pattern. The "0" signal at the input of INV 20 is applied to the left input of AND 23, preventing further transfer of signals from register SR to pattern-forming means 10. Also the "1" signal at the output of INV 20 is applied, as already explained, to the inputs of AND 20, AND 21 and to the input of astable-multivibrator circuit AM. As a result, in the manner already set forth, the information in register SR is shifted rightwards, at high speed, until a "1" signal appears at the E-track output of the register, this happening as soon as the first-stitch control signals reach the output of the register. As soon as this happens, the "1" signal at the E-track output is applied to AND 23, and the first-stitch control signals at the output of the register SR are transmitted to the pattern-forming means 10.

What happens at the time of the last-stitch information is to be noted. The last-stitch information is applied to pattern-forming means 10 in the same way as the information for the preceding stitches. Then, the next machine-synchronized pulse from pulse generator PG results in the appearance, at the output of register SR, of signals having no relationship to the pattern. Gating circuit G 1 is immediately blocked, and the information in register SR is shifted, at very high speed, until the first-stitch information appears at the register output, whereupon the high-speed shift ends and the gating circuit G 1 is reenabled. It will be understood that the high-speed shift is performed at electronic speed, and it has a duration which is virtually zero compared to the time interval between successive machine-synchronized pulses from pulse generator PG. Accordingly, the successive stitches of the selected pattern are sewn repeatedly without interruption or disturbance of machine synchronization.

In the foregoing, it is assumed that the information transferred into shift register SR is read out from ROM 4. However, alternatively, the information written into register SR can be derived from DRD, in the manner already described with respect to FIGS. 7a–7b.

It will be understood that each of the elements described above, or two or more together, may also find a useful application in other types of circuits and constructions differing from the types described above.

While the invention has been illustrated and described as embodied in pattern-control circuits using particular types of random-access and sequential-access memories, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a sewing machine, an arrangement for forming patterns made up of stitches, comprising, in combination, a first memory having a plurality of outputs; a second memory having a plurality of inputs connected to the outputs of the first memory and having a plurality of outputs, at least one of said first and second memory being a static memory having a plurality of address signal inputs and comprised of a plurality of storage units addressable by address signals applied to the address signal inputs thereof; stitch-forming means provided with a plurality of stitch control signal inputs connected to the outputs of the second memory and operative for producing any of a plurality of different stitches in dependence upon the signals produced at the outputs of the second memory; and information-transfer means connected to the first and second memories, operative for reading out information from the first memory and writing such information into the second memory not in synchronism with operation of the stitch-forming means, and thereafter operative for reading out information from the second memory and transferring such information to the stitch-forming means in synchronism with operation of the stitch-forming means, the information-transfer means including control means operative when activated for effecting the read-out of information from the static memory by applying to the address signal inputs of the static memory a series of next-address signals derived from signals produced at the outputs of the static memory.

2. In a sewing machine as defined in claim 1, the first memory being a static memory, the control means comprising means operative when activated for effecting the read-out of the first memory by applying to the address signal inputs of the first memory a series of next-address signals derived from signals produced at the outputs of the first memory.

3. In a sewing machine as defined in claim 1, the second memory being a static memory, the control means comprising means operative when activated for effecting the read-out of the second memory by applying to the address signal inputs of the second memory a series of next-address signals derived from signals produced at the outputs of the second memory.

4. In a sewing machine as defined in claim 1, the first memory being a static memory, the second memory being a sequential-access dynamic memory, the control means comprising means operative for effecting the read-out of the static memory by applying to the address signal inputs of the static memory a series of next-address signals derived from signals produced at the outputs of the static memory and not synchronized with operation of the stitch-forming means and thereafter operative for effecting the read-out of the sequential-access dynamic memory by applying thereto in synchronism with operation of the stitch-forming means a train of indistinguishable read-out signals.

5. In a sewing machine as defined in claim 4, the sequential-access dynamic memory being a shift register having stitch control signal inputs connected to the outputs of the first memory and furthermore having a shift-signal input, the means effecting the read-out of the sequential-access dynamic memory comprising means operative for reading-out the shift register by applying to the shift-signal input thereof a train of indistinguishable shift signals synchronized with operation of the stitch-forming means.

6. In a sewing machine as defined in claim 1, the first and second memory each being a static memory and each having a plurality of address signal inputs and each being comprised of a plurality of storage units addressable by address signals applied to the respective address signal inputs, the second memory furthermore having a plurality of next-address-signal inputs and a plurality of next-address-signal outputs, the control means comprising means reading-out the first memory by applying to the address signal inputs thereof a series of next-address signals derived from signals produced at the outputs of the first memory and not synchronized with operation of the stitch forming means, furthermore operative not in synchronism with operation of the stitch-forming means for writing into the second memory the signals produced during read-out of the first memory and also a series of next-address signals applied to the next-address-signal inputs, and thereafter operative in synchronism with operation of the stitch-forming means for reading-out the second memory by applying to the address signal inputs of the second memory a series of next-address signals derived from signals produced at the next-address-signal outputs of the second memory.

7. In a sewing machine as defined in claim 1, furthermore comprising external pattern data reading means having a plurality of stitch-control-signal outputs, the inputs of the second memory additionally being connected to the stitch-control-signal outputs of the external pattern data reading means, the information-transfer means comprising means connected to the external pattern data reading means and to the second memory, operative for writing information from the stitch-control-signal outputs of the external pattern data reading means into the second memory and thereafter operative for reading information out from the second memory in synchronism with operation of the stitch-forming means.

* * * * *